United States Patent [19]

Chapman et al.

[11] Patent Number: 5,473,675
[45] Date of Patent: Dec. 5, 1995

[54] CALL ESTABLISHMENT FOR SIMULTANEOUS ANALOG AND DIGITAL COMMUNICATIONS

[75] Inventors: Joseph Q. Chapman; Kurt E. Holmquist, both of Largo, Fla.

[73] Assignee: AT&T IPM Corp., Coral Gables, Fla.

[21] Appl. No.: 153,009

[22] Filed: Nov. 12, 1993

[51] Int. Cl.⁶ .................................................. H04M 11/00
[52] U.S. Cl. .............................................. 379/93; 379/98
[58] Field of Search ............................ 379/98, 100, 102, 379/104, 105, 96, 97, 94, 93; 375/8

[56] References Cited

U.S. PATENT DOCUMENTS

| | | | |
|---|---|---|---|
| 4,512,013 | 4/1985 | Nash et al. | 370/69.1 |
| 4,546,212 | 10/1985 | Crowder, Sr. | 370/69.1 |
| 4,663,778 | 5/1987 | Takahashi | 379/100 |
| 4,672,602 | 6/1987 | Hargrave et al. | 370/58 |
| 4,757,495 | 7/1988 | Decker et al. | 370/76 |
| 4,821,312 | 4/1989 | Horton et al. | 379/102 |
| 4,908,851 | 3/1990 | Kotani et al. | 379/100 |
| 5,022,071 | 6/1991 | Mozer et al. | 379/100 |
| 5,023,903 | 6/1991 | Bowen | 379/98 |
| 5,131,026 | 7/1992 | Park | 379/102 |
| 5,146,489 | 9/1992 | Telibasa | 379/100 |
| 5,202,915 | 4/1993 | Nishii | 379/98 |

FOREIGN PATENT DOCUMENTS

| | | | |
|---|---|---|---|
| 94308072 | 2/1995 | European Pat. Off. . | |
| 2242336 | 9/1991 | United Kingdom | H04M 11/06 |

*Primary Examiner*—Wing F. Chan
*Assistant Examiner*—Stella L. Woo
*Attorney, Agent, or Firm*—David R. Padnes; Patricia A. Verlangieri

[57] ABSTRACT

A modem, capable of simultaneously coupling voice and data signals, connects local digital terminal equipment (DTE) and a local telephone to a communications link. To prevent the local DTE from responding to a communications containing only voice signals, the local DTE is notified of an incoming communication only after detection of calling tone signals on the communications link. Such signals indicate a remote DTE desires to establish a data communications path with the local DTE. This operation advantageously prevents the modem from transmitting an annoying answer tone to a calling party.

11 Claims, 2 Drawing Sheets

CALL ESTABLISHMENT FOR SIMULTANEOUS ANALOG AND DIGITAL COMMUNICATIONS

TECHNICAL FIELD

The present invention relates to a technique for establishing a communications link between modems having the capability of simultaneously transmitting analog and digital signals.

BACKGROUND OF THE INVENTION

The ability to simultaneously communicate analog and digital signals through a communications channel is known. In one prior art technique, the voice and data signals are typically transmitted either via frequency-division multiplexing or time-division multiplexing. In frequency-division multiplexing, the data channel and the voice channel are allocated different sub-bands of the channel's bandwidth. Examples of that are U.S. Pat. Nos. 4,757,495, 4,672,602, and 4,546,212. In time-division multiplexing arrangements, voice signals are sampled, digitized, and interleaved with digital data to form a single information stream which is communicated over the available channel. Practically every digital carrier system (e.g. the T1 carrier system) is an example of that. In another prior an technique set forth in U.S. Pat. No. 4,512,013, issued Apr. 16, 1985, something akin to frequency division multiplexing is used to attain simultaneous voice and data half duplex operation. Finally, most recently, in a pending patent application entitled "Technique for Modulating Orthogonal Signals with One or More Analog or Digital Signals", Ser. No. 08/076526, filed Jun. 14, 1993, assigned to the present assignee, and incorporated herein by reference, the ability to simultaneously send voice and data or either voice or data alone through a communications channel in a nonmultiplexer manner using a generally coextensive frequency band is disclosed.

With any of the foregoing techniques, a modem interconnects an associated telephone and data terminal equipment (DTE) to other remote telephones and DTEs via a communications link. This link is typically pan of the public switched telephone network (PSTN). In any event, there is a need for the modem to appropriately interact with its associated telephone and DTE for incoming calls. For incoming calls, such interaction involves providing an off-hook signal to the communications link and ringing the phone for voice calls, or appropriately forwarding the incoming data to the DTE or a combination of both of these functions. One prior art technique for providing this interaction for a communication simultaneously coupling voice and data requires that the communication be established by using an application program which activates a modem's autodialer. The users at each end of the communications link are expected to be "standing by" and upon noting the receipt of incoming data via the applications programs can pick up their respective telephones. Obviously, this procedure requires that the communications be prearranged. In addition, the communications program has to staff as a data call with voice communications being subsequently added.

While the foregoing methodology works satisfactorily, it is not suitable for many communications users who use their voice and data communications equipment in a completely arbitrary, unscheduled, and unplanned manner. It would therefore be desirable if a technique could be devised wherein a modem would interact with its associated voice and DTE in a manner compatible with such usage.

SUMMARY OF THE INVENTION

To overcome the limitations of the prior art, digital terminal equipment (DTE) connected to a local modem capable of simultaneously coupling voice and data signals is notified of an incoming communications from a remote location upon detection of a signal, indicating that the DTE at that remote location desires to establish a data communication connection. As a result, the DTE will not inadvertently respond to incoming communications which only include voice signals. Advantageously, this operation is transparent to the DTE and, therefore, does not conflict with the operation of any DTE-resident application programs.

In the disclosed embodiment, a modem goes "off-hook" in response to ringing signals and then examines the incoming signals for the presence of calling tone signals. Upon such detection, a ring indicator signal is provided to the locally-connected DTE. If the calling tone signal is not detected, the locally-connected DTE is not apprised of the incoming communications. One aspect of this procedure is that it can be modified so that the modem only goes off-hook after detection of a predetermined number of ringing signals. Another aspect of this procedure is that the examination of the calling tone can be enabled for a predetermined time interval after the modem goes off-hook and the modem is automatically returned to an on-hook state if the calling tone signal is not detected within this time interval.

DETAILED DESCRIPTION

Figure 1:
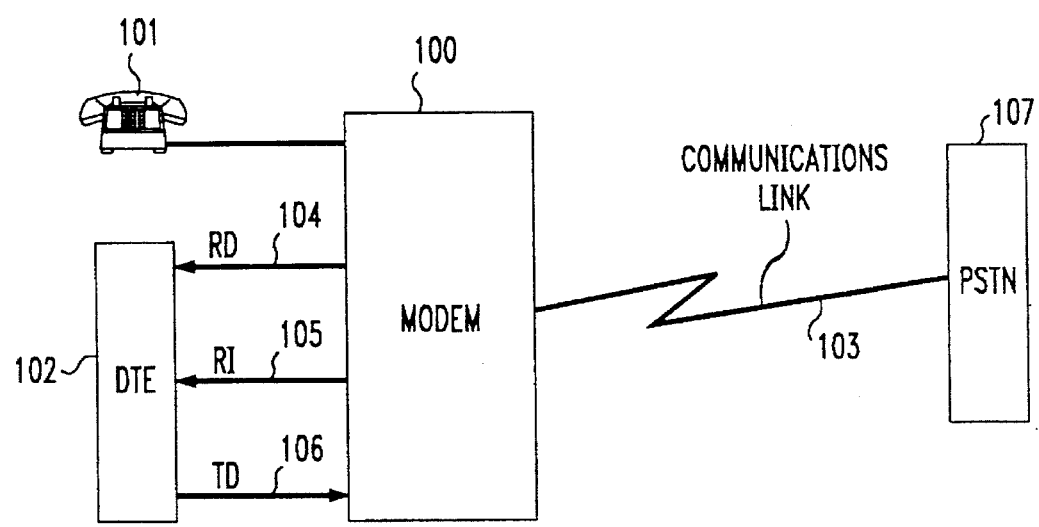
FIG. 1 is a block schematic diagram which indicates an illustrative application of the present invention.

FIG. 1 shows an illustrative application of the present invention wherein a modem 100, capable of simultaneously coupling analog and digital signals through communications link 103, is connected to a local telephone 101 and local DTE 102. For illustrative purposes, modem 100 is of the type which can simultaneously couple voice signals and digital data in a nonmultiplexed manner through a generally coextensive frequency band. Of course, modem 100 could also be of the type which utilizes other well-known techniques, previously discussed, to couple analog and digital signals simultaneously. The interconnection between modem 100 and DTE 102 includes leads 104–106 which respectively couple receive data (RD), ring indicator (R.I), and Transmit Data (TD) signals. Link 103 may be of a variety of types including, wire, optical fiber, and/or wireless (cellular and/or noncellular). For purposes of illustration, link 103 is part of the public telephone network (PSTN) and the remote end (not shown) is assumed to be terminated in a modem, telephone, and DTE substantially identical to their respective counterparts in FIG. 1. It should be understood, of course, that networks other than the PSTN, such as private line networks, can be used in lieu of the PSTN. Indeed, the present invention is applicable for use in any network which provides ringing signals to announce the arrival of incoming communications and wherein calling tones are provided by a DTE desiring to communicate data to another DTE.

Figure 2:
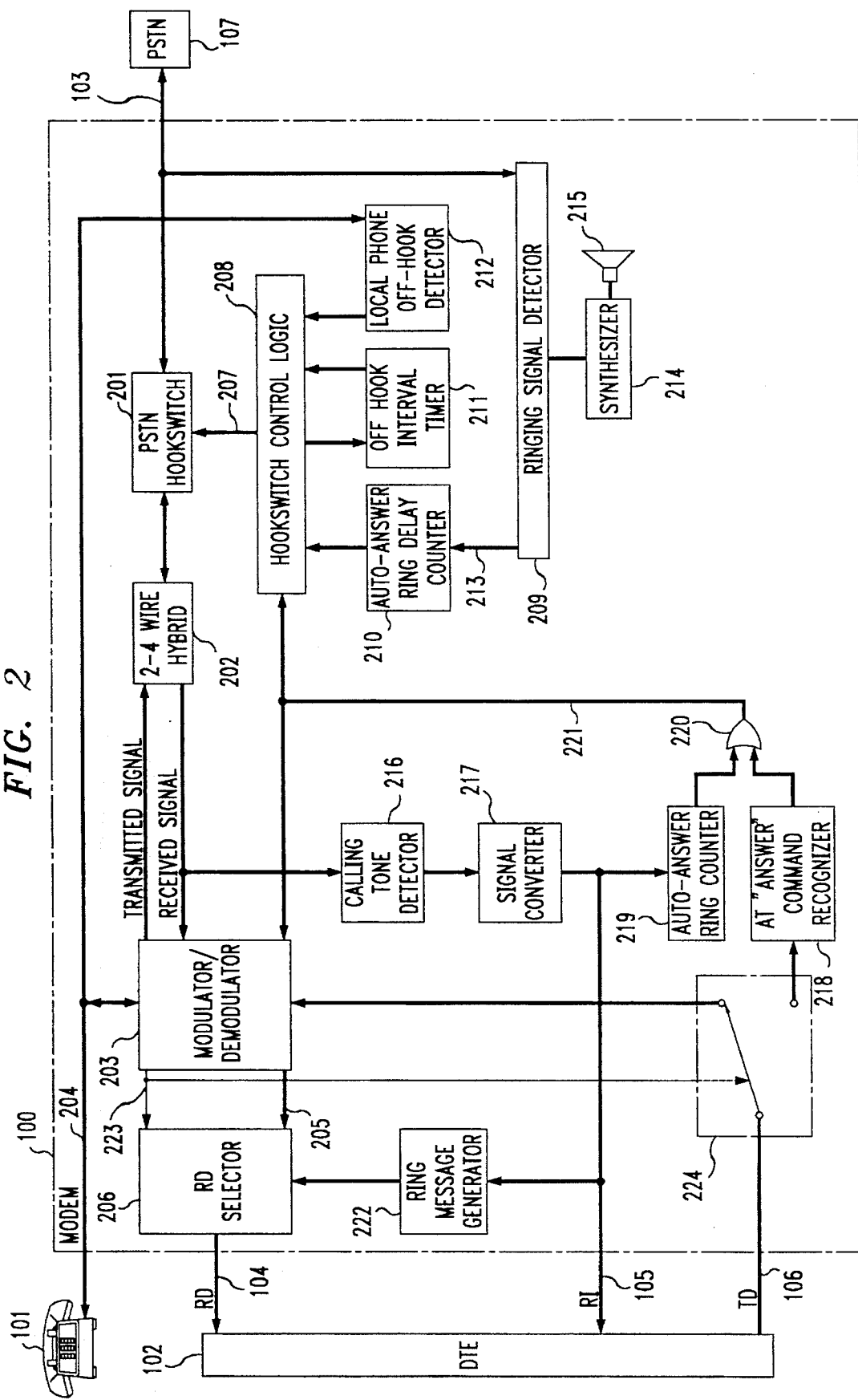
FIG. 2 is a block-schematic diagram of a disclosed embodiment of the present invention.

Refer now to FIG. 2 which shows the circuitry within modem 100 pursuant to an embodiment of the present invention. Modem 100 includes hookswitch 201 which is connected between communications link 103 and conventional 2–4 wire hybrid 202. Hybrid 202 functions in well-known fashion to couple incoming or received signals from link 103 to modulator/demodulator 203 when the modem is off-hook. In the opposite direction, assuming the hookswitch is in an off-hook state, the hybrid couples transmitted signals from the modulator/demodulator 203 through the hookswitch to link 103. The modulator/demodulator couples voice signals to and from telephone 101 via leads 204 and couples data signals to and from the DTE. The transmit data signals are provided by lead 106 and the receive data signals are coupled via lead 205 through receive data (RD) selector 206 to lead 104.

The state of hookswitch 201 is controlled by signals provided by hookswitch control logic 208 onto lead 207. Such control logic is well-known and, in the past, responded to the detection of ringing signals on link 103 by a ringing signal detector 209. Now, in accordance with the disclosed embodiment, hookswitch control logic 208 also responds to auto-answer ring delay counter 210, off-hook interval timer 211, and local phone off-hook detector 212.

Counter 210 stores a predetermined count in one internal register and compares this count to that held in a second incrementable register. The count in this second register is incremented by control signals on lead 213 which are generated each time ringing signal detector 209 detects the presence of ringing signals on link 103 and provides a signal on lead 213. This signal is created after the trailing edge of the active phase envelope of each ringing signal. While the use of counter 210 is optional, the incorporation of this device advantageously provides a time interval for an incoming communication to be answered by telephone 101 before control logic 208 is instructed by counter 210 to place the modem in an off-hook state. Counter 210 can also be disabled so that counter 210 will instruct control logic 208 to place hookswitch in an off-hook state upon detection of the first ringing signal by detector 209.

An indication of the arrival of this incoming communications can be provided to the telephone in a number of ways depending on the type of telephone. For example, if telephone 101 is of the digital type, such as used in many business communications systems, detector 209 can be connected to a signal formatter (not shown) so that the detection of a ringing signal provides the appropriate ring indicating signals directly to telephone 101. Or, as shown, detector 209 is coupled to synthesizer 214 which provides synthesized ringing signals to speaker 215.

For outgoing calls from telephone 101, the off-hook state of the telephone is detected by detector 212 which, in turn, directs control logic 208 to place the modem hookswitch 201 in the off-hook state.

Once the modem is placed in the off-hook state, incoming signals can be coupled through the hybrid and are accessible by calling tone detector 216. This detector senses the received signals from communications link 103 for the presence of calling tone signals from a remote DTE. If these signals are detected, indicating that the coupling of data is desired from a remote DTE to DTE 102, signal converter 217 responds to the detection of calling tones signals by detector 216 and provides a RI signal to the DTE via lead 105. With the use of this calling tone detection, the DTE is not notified of an incoming communication unless the calling tone signals are detected. As a result, the DTE will not respond and the modem is prevented from outputting an answer tone over the communications link which would be annoying to a user at the remote end of the communications link trying to establish a voice call to telephone 102.

The RI signal is processed within the DTE in conventional fashion and is compatible with existing DTE application programs. For example, many such applications respond to the RI signal by providing an "AT answer" signal on lead 106. During call establishment, i.e., before modem 100 and its counterpart at the remote end of communications link 103 are in a data communications mode, switch 224 couples the TD signal on lead 106 to AT answer command recognizer 218 which, in turn, provides a logic "1" output signal. This output signal is coupled through OR gate 220 to lead 221 and thence modulator/demodulator 203. Upon receipt of the logic "1" signal, the modulator/demodulator begins a sequence of well-known operations. This sequence includes the transmission of an answer tone followed by the transmission of one or more training sequences, which adapt apparatus in the modem at the remote end of link 103. After this adaptation is completed, the modulator/demodulator 203 outputs a control signal on lead 223 which toggles switch 224 to connect lead 106 to the modulator/demodulator. Modem 100 also preferably includes auto-answer ring counter 219 which stores a predetermined answer count which is incremented by the detection and synthesizing of each RI signal. Once the number of calling tone signals is detected, counter 219 provides a logic "1" output. The count stored in counter 219 is user-designated and this count can be set to 1 so as to effectively disable counter operation. OR gate 220 outputs a logic "1" control signal to control logic 208 on lead 221 in response to a logic "1" input on either one of its input leads.

While calling tone detector is able to detect for the appearance of calling tones once the modem hookswitch is in the off-hook state, modem 100 preferably includes off-hook interval timer 211 which is activated once the modem goes into an off-hook state. Once activated, timer 211 will cause control logic 208 to place the hookswitch 201 back into an on-hook state if the control logic has not received a logic "1" signal on lead 221 within the time interval set by timer 211.

Modem 100 also includes ring message generator 222 which responds to synthesized RI signals on lead 105 by outputting a digital ring "message" to RD selector 206. The selector, in turn, couples such ring messages over RD lead 104 to the DTE. Use of generator 222 and selector 206 advantageously permits modem 100 to appropriately inform the DTE of an incoming data call when the DTE is operating in a mode wherein it does not respond to RI signals but instead responds to predetermined digital ring messages. Selector 206 selects either the output of ring message generator 222 or the output of modulator/demodulator 203 for coupling to RD lead 104. This selection is controlled by a signal provided by the modulator/demodulator on lead 223. This signal places the RD selector in a mode wherein the output of the modulator/demodulator is coupled to lead 104 once an AT answer command is provided by DTE 102 on lead 106. Prior to the receipt of the AT answer command, the control signal on lead 223 causes selector 206 to couple the ring message from generator 222 to lead 104.

The above described apparatus is clearly evident when its operation is examined for each of the four combinations of manual origination (meaning originating as a voice call), auto-dialer origination (meaning originating as a modem call), manual answering (meaning the user answers expecting a voice call), and auto-answering (meaning the DTE answers expecting a data call). Because the same phone line is used for voice-only calls, data-only calls, and simultaneous voice and data calls, it is beneficial that transitions from one mode to another can be made within the same call and that a mutually usable type of connection can be made regardless of mismatches between the intentions of the originator and the mode of operation of the answerer.

The manual origination, manual answer combination, which initially establishes an ordinary voice connection, can be considered to be the most favorable way for simultaneous voice and data sessions to begin because it provides the participants the opportunity to verbally negotiate the specifics for the data portion of the call. For example, it will typically be necessary for the participants to agree upon a DTE software application to be used, to establish the originator/answerer roles to be assumed by each DTE (since the applications suitable for such use typically operate asymmetrically and require that the user designate the role of the program in the current call as either the originator or answerer), and to synchronize the transition from ordinary voice conversation into a simultaneous voice and data session. Once this has been accomplished, the participant whose DTE software will assume the role of the answerer starts the program in this mode and tells the other person to begin. At this point, this person starts the DTE application in the originate mode. This DTEs application program then attempts to dial a number by sending the standard "ATDT. . ." command to the modem. The response of the modem is to begin the call establishment process by "listening" for answer-back tone while sending calling tone. The DTE application program at the other end of the established circuit, having been directed to assume the role of answerer, expects to be notified by the modem of a pending inbound call via either the RI signal or the "RING" message. This is exactly what this modem does upon detection of the calling tone signal being sent from the other end. When, in response to this notification, the DTE commands the modem to answer, the modem returns the answer tone expected by the opposite modem and the normal training process begins culminating in establishment of a simultaneous voice and data connection. Thus, through incorporation of the invention, a "natural" transition from a normal voice connection into the simultaneous voice and data session can be done without requiring any special provisions on the part of the DTE applications software. The indications from the modem to the DTE during the course of transition from a normal voice connection to the simultaneous voice and data session are the same as they are for a normal modem connection establishment.

In the remaining combinations of origination and answering mode, connections can also be successfully established without requiring any special provisions in the DTE software. For the combination of autodialer origination and auto-answering, when the answering modem detects calling tone after going off-hook and converts this to a ring indication to the DTE, normal establishment of a data connection by the modem begins upon receiving the command to answer from the DTE. For the combination of auto-dialer origination and manual answer, the user can simply hang up the local phone upon heating calling tone and establishment of a data connection will proceed as described previously. Finally, in the case of the combination of manual origination and auto-answering, a properly trained user who still desires a data-only session in lieu of simultaneous voice and data, upon hearing cessation of the ringback signal followed by silence (instead of the expected voice greeting), can simply start the DTE application in originate mode resulting in transmission of calling tone by the modem and completion of the data connection.

It should, of course, be understood that while the present invention has been described in reference to an illustrative embodiment, other arrangements may be apparent to those of ordinary skill in the art. For example, while the disclosed embodiment utilizes discreet devices, these devices can be implemented using one or more appropriately programmed, general-purpose processors or special-purpose integrated circuits or digital processes or an analog of hybrid counterpart of any of these devices. Or, for example, while in the disclosed embodiment, apparatus is added to a modem capable of simultaneous analog and digital signal communication, this apparatus could be disposed in an adjunct which interfaces with this type of modem.

We claim:

1. Apparatus for use with first data terminal equipment deposited at a first end of a communications link, said apparatus comprising:

a port for connecting to said communications link;

switch means connected to said port;

a hybrid coupled to said switch means;

a modulator/demodulator coupled to said hybrid;

first means for coupling to said hybrid, through said modulator/demodulator, a communication device, which communication device has an "off-hook" signaling means; and second means for coupling said "off-hook" signaling means to said switch means.

2. The apparatus of claim 1 further comprising means for coupling to said modulator/demodulator, a second data terminal equipment.

3. The apparatus of claim 1 wherein said communication device is a telephone.

4. The apparatus of claim 1 wherein said means for coupling said "off-hook" signalling means to said switch means comprises an "off-hook" detection means.

5. The apparatus of claim 2 wherein said means for coupling said second data terminal equipment to said modulator/demodulator includes:

means for detecting the presence of predetermined signals on said port following ringing signals on said port; and means responsive to the detected presence of said predetermined signals for communicating protocol signals to said port for transmission to said first data terminal equipment.

6. The apparatus of claim 5 wherein said predetermined signals are calling tone signals.

7. The apparatus of claim 5 wherein said protocol signals form a predetermined digital message.

8. The apparatus of claim 7 wherein said predetermined digital message initiates a predetermined sequence of communications between said second data terminal equipment and said first data terminal equipment when coupled to said port to establish a data communication connection between said first and said second data terminal equipment.

9. The apparatus of claim 2 wherein said communication device and said second data terminal equipment can alternate their use in a single communication session.

10. The apparatus of claim 2 wherein a communication session uses either said communication device or said second data communication equipment pursuant to user selection.

11. The apparatus of claim 2 wherein said modulator/demodulator is of the type which can simultaneously transmit analog and digital signals during a single communication session.

* * * * *